US011808720B2

(12) United States Patent
Matsui et al.

(10) Patent No.: US 11,808,720 B2
(45) Date of Patent: Nov. 7, 2023

(54) EDGE CRACK DETECTION DEVICE, ROLLING MILL FACILITY AND EDGE CRACK DETECTION METHOD

(71) Applicant: PRIMETALS TECHNOLOGIES JAPAN, LTD., Hiroshima (JP)

(72) Inventors: Yoichi Matsui, Hiroshima (JP); Yuta Odawara, Hiroshima (JP)

(73) Assignee: PRIMETALS TECHNOLOGIES JAPAN, LTD., Hiroshima (JP)

(\*) Notice: Subject to any disclaimer, the term of this patent is extended or adjusted under 35 U.S.C. 154(b) by 0 days.

(21) Appl. No.: 17/913,342

(22) PCT Filed: Aug. 18, 2020

(86) PCT No.: PCT/JP2020/031091
§ 371 (c)(1),
(2) Date: Sep. 21, 2022

(87) PCT Pub. No.: WO2022/038668
PCT Pub. Date: Feb. 24, 2022

(65) Prior Publication Data
US 2023/0142679 A1 May 11, 2023

(51) Int. Cl.
*G01N 23/18* (2018.01)
*G01N 23/16* (2018.01)
*B21B 38/00* (2006.01)

(52) U.S. Cl.
CPC ............. *G01N 23/18* (2013.01); *B21B 38/00* (2013.01); *G01N 23/16* (2013.01)

(58) Field of Classification Search
CPC ......... B21B 38/00; G01N 23/16; G01N 23/18
See application file for complete search history.

(56) References Cited

FOREIGN PATENT DOCUMENTS

| JP | 53-17383 A | 2/1978 |
| JP | 61-99846 A | 5/1986 |
| JP | 1-250848 A | 10/1989 |
| JP | 6-288934 A | 10/1994 |

(Continued)

OTHER PUBLICATIONS

International Preliminary Report on Patentability and English translation of the Written Opinion of the International Searching Authority for International Application No. PCT/JP2020/031091, dated Mar. 2, 2023.

(Continued)

*Primary Examiner* — Mark R Gaworecki
(74) *Attorney, Agent, or Firm* — Birch, Stewart, Kolasch & Birch, LLP

(57) ABSTRACT

An apparatus for detecting an edge crack of a metal plate being conveyed includes: a detection part including a plurality of elements configured to detect a presence or absence of the metal plate at a position of the element in the plate width direction; a plate edge position determination part configured to determine a plate edge position of the metal plate in the plate width direction on the basis of a detection result of each of a plurality of first elements positioned within a first region in the plate width direction; and an edge crack detection part configured to detect an edge crack of the metal plate on the basis of a detection result of each of a plurality of second elements selected on the basis of the plate edge position and positioned within a second region which is narrower than the first region in the plate width direction.

13 Claims, 13 Drawing Sheets

(56) References Cited

FOREIGN PATENT DOCUMENTS

JP            9-89809 A     4/1997
JP         2004-257859 A    9/2004

OTHER PUBLICATIONS

International Search Report (PCT/ISA/210) issued in PCT/JP2020/031091, dated Nov. 2, 2020.
Written Opinion of the International Searching Authority (PCT/ISA/237) issued in PCT/JP2020/031091, dated Nov. 2, 2020.
Partial Supplementary European Search Report dated Apr. 12, 2023 issued in corresponding European Application No. 20950234.3.

EDGE CRACK DETECTION DEVICE, ROLLING MILL FACILITY AND EDGE CRACK DETECTION METHOD

TECHNICAL FIELD

The present disclosure relates to an edge crack detection device, a rolling mill facility and an edge crack detection method.

BACKGROUND ART

In the process of producing a metal plate, an edge crack may be formed at an end portion of the metal plate in the plate-width direction. It is important to detect an edge crack appropriately since growth of an edge rack may lead to breakage of the metal plate.

Patent Document 1 discloses a technique to detect an edge crack of a steel plate on the basis of an abrupt decrease of the plate thickness in the longitudinal direction of the steel plate at a plate edge portion using an edge profile meter disposed on the output side of the rolling process line. The edge profile meter disclosed in Patent Document 1 includes an X-ray generator and an X-ray detector disposed so as to face one another at the plate edge portion. The X-ray detector includes a plurality of sensors arranged in the plate-width direction, and is configured to measure the distribution of the plate thickness by detecting X-rays generated by the X-ray generator and attenuated by the steel plate.

Citation List

Patent Literature

Patent Document 1: JPH9-89809A

SUMMARY

Problems to be Solved

Meanwhile, in a case where an edge crack of a metal plate being conveyed on a rolling line or the like is detected by using a plurality of sensors (elements) arranged in the plate-width direction, a calculator needs to receive and process a large number of detection signals continuously sent from the plurality of sensors at short intervals. Thus, to appropriately detect a small edge of a metal plate being conveyed at a high speed, it is desired to detect an edge crack efficiently.

In view of the above, an object of at least one embodiment of the present invention is to provide an edge crack detection device, a rolling mill facility, and an edge crack detection method capable of detecting an edge crack of a metal plate efficiently.

Solution to the Problems

According to at least one embodiment of the present invention, an edge crack detection apparatus for detecting an edge crack of a metal plate being conveyed includes: a detection part including a plurality of elements arranged along a plate width direction of the metal plate, each of the plurality of elements being configured to be capable of detecting presence or absence of the metal plate at a position of the element in the plate width direction; a plate edge position determination part configured to determine a plate edge position of the metal plate in the plate width direction on the basis of a detection result of each of a plurality of first elements positioned within a first region in the plate width direction, from among the plurality of elements; and an edge crack detection part configured to detect an edge crack of the metal plate on the basis of a detection result of each of a plurality of second elements selected on the basis of the plate edge position and positioned within a second region which is narrower than the first region in the plate width direction, from among the plurality of elements.

Furthermore, according to at least one embodiment of the present invention, a rolling mill facility includes: a rolling mill apparatus for rolling a metal plate; and the above described edge crack detection apparatus configured to detect an edge crack at an end portion, in the plate width direction, of the metal plate during rolling by the rolling mill apparatus.

Furthermore, according to at least one embodiment of the present invention, a method of detecting an edge crack of a metal plate being conveyed, using a detection part including a plurality of elements arranged along a plate width direction of the metal plate, each of the plurality of elements being configured to be capable of detecting presence or absence of the metal plate at a position of the element in the plate width direction, includes: a step of determining a plate edge position of the metal plate in the plate width direction on the basis of a detection result of each of a plurality of first elements positioned within a first region in the plate width direction, from among the plurality of elements; a step of selecting, on the basis of the determined plate edge position, a plurality of second elements positioned within a second region which is narrower than the first region in the plate width direction, from among the plurality of elements; and a step of detecting an edge crack of the metal plate on the basis of a detection result by each of the plurality of the selected second elements.

Advantageous Effects

According to at least one embodiment of the present invention, it is possible to provide an edge crack detection device, a rolling mill facility, and an edge crack detection method capable of detecting an edge crack of a metal plate efficiently.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

(Configuration of Rolling Mill Facility)

The following description describes a rolling mill facility for rolling a metal plate as an example of application of an edge crack detection apparatus according to some embodiments. Nevertheless, the edge crack detection apparatus according to some embodiments may be applied to a metal plate processing apparatus other than the rolling mill facility.

Figure 1:
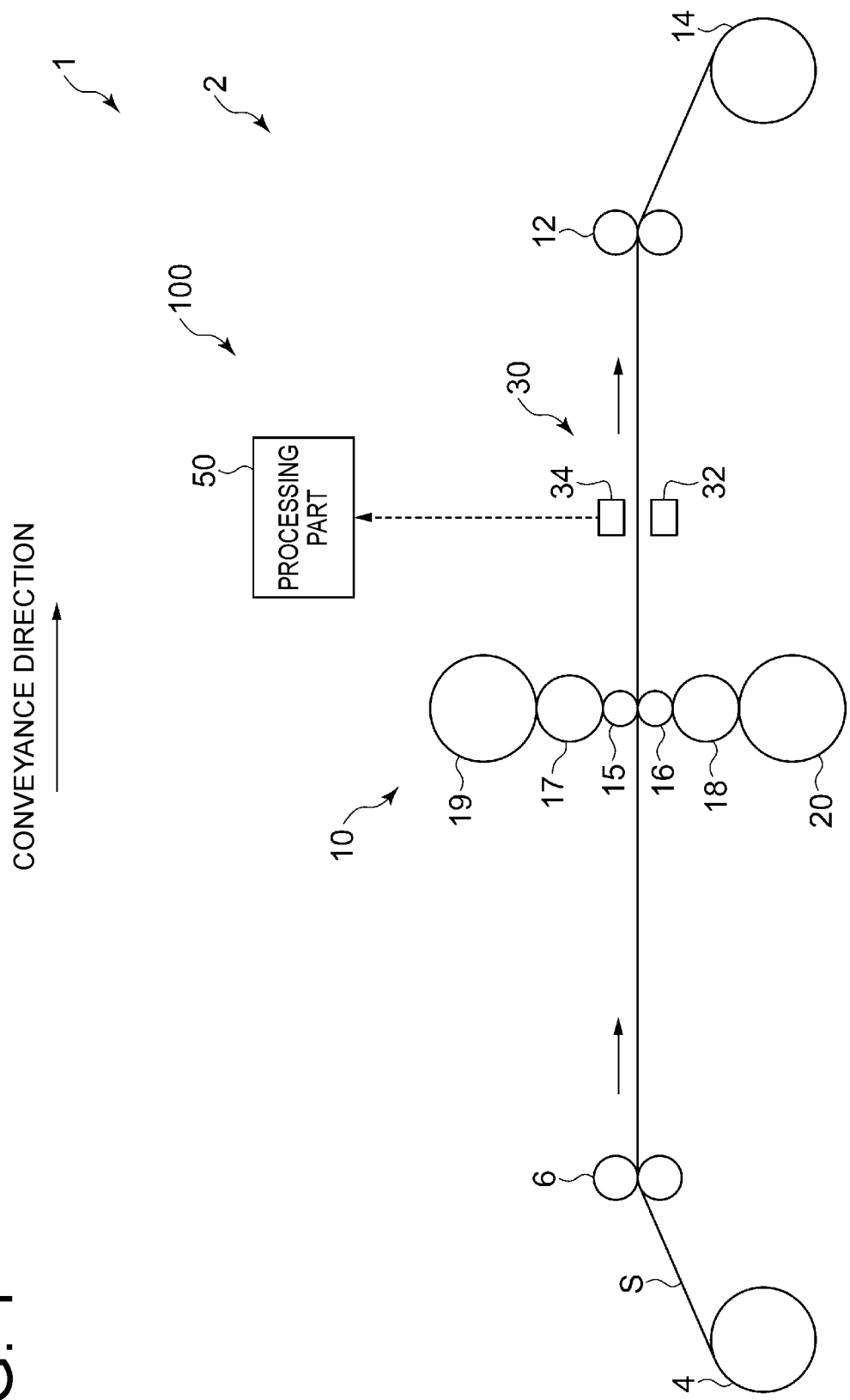
FIG. 1 is a schematic configuration diagram of a rolling mill facility according to an embodiment.

FIG. 1 is a schematic configuration diagram of a rolling mill facility to which an edge crack detection apparatus according to an embodiment is applied. As depicted in FIG. 1, a rolling mill facility 1 includes a rolling mill apparatus 2 configured to roll a metal plate S, and an edge crack detection apparatus 100 for detecting an edge crack of the metal plate S.

The rolling mill apparatus 2 includes at least one rolling mill stand 10 for rolling the metal plate S. In the illustrative embodiment depicted in FIG. 1, the rolling mill apparatus 2 includes a single rolling mill stand 10. In another embodiment, the rolling mill apparatus 2 may include two or more rolling mill stands 10.

The rolling mill apparatus 2 includes an unwinder 4 for unwinding a coil of the metal plate S toward the rolling mill stand 10, and a rewinder 14 for rewinding the metal plate S from the rolling mill stand 10. Furthermore, an input-side pinch roll 6 and an output-side pinch roll 12 for guiding the metal plate S may be disposed between the rolling mill stand 10 and the unwinder 4, and between the rolling mill stand 10 and the rewinder 14.

The rolling mill stand 10 depicted in FIG. 1 includes a pair of work rolls 15, 16 disposed so as to pinch the metal plate S being a rolling material, and a pair of intermediate rolls 17, 18 and a pair of backup rolls 19, 20 disposed opposite to the metal plate S across the pair of work rolls 15, 16, respectively. The intermediate rolls 17, 18 and the backup rolls 19, 20 are configured to support the work rolls 15, 16. Furthermore, the rolling mill stand 10 includes a rolling reduction device (not depicted) for rolling down the metal plate S by applying a load to the pair of work rolls 15, 16.

A motor (not depicted) is connected to the work rolls 15, 16 via a spindle (not depicted) or the like, such that the work rolls 15, 16 are rotary driven by the motor. When the metal plate S is rolled, the motor rotates the work rolls 15, 16 while the rolling reduction device rolls down the metal plate S and thereby a friction force is generated between the work rolls 15, 16 and the metal plate S. The metal plate S is conveyed to the output side of the work rolls 15, 16 by the friction force.

(Configuration of Edge Crack Detection Apparatus)

Figure 2:
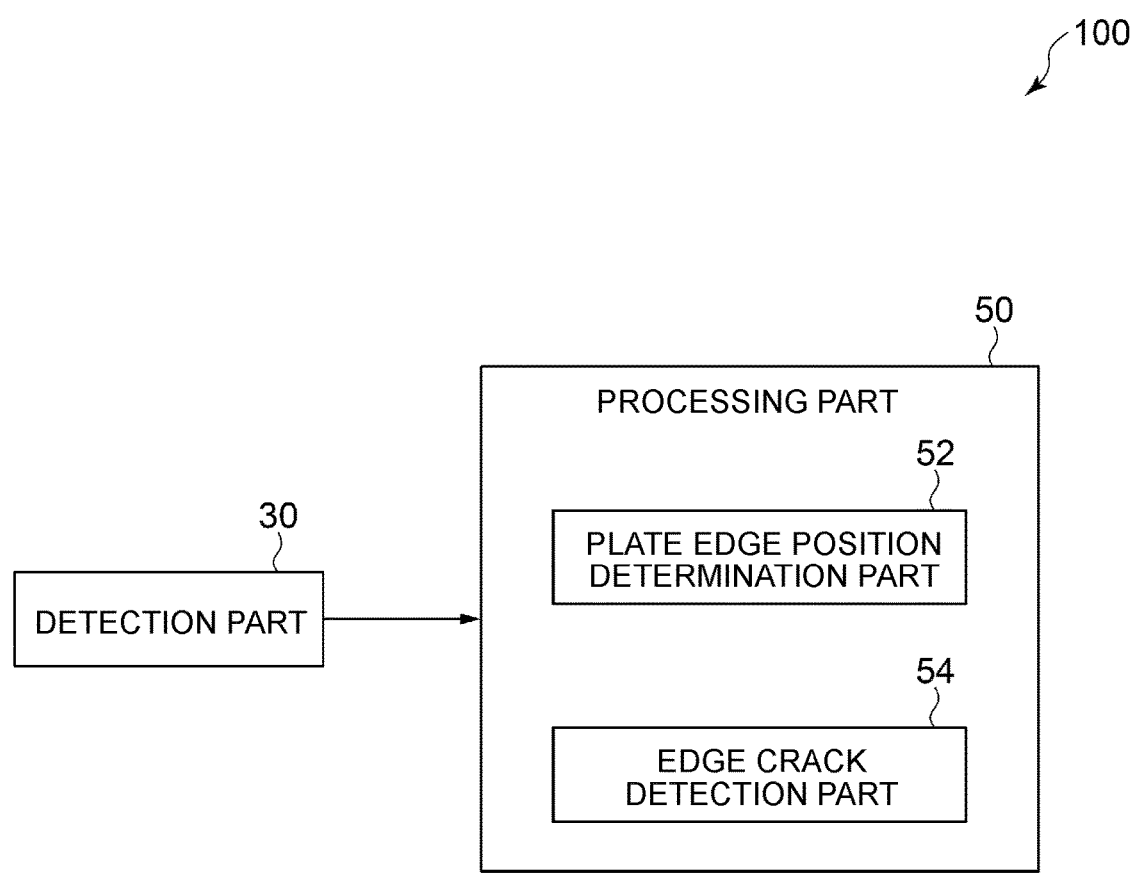
FIG. 2 is a schematic configuration diagram of an edge crack detection apparatus according to an embodiment.
Figure 3:
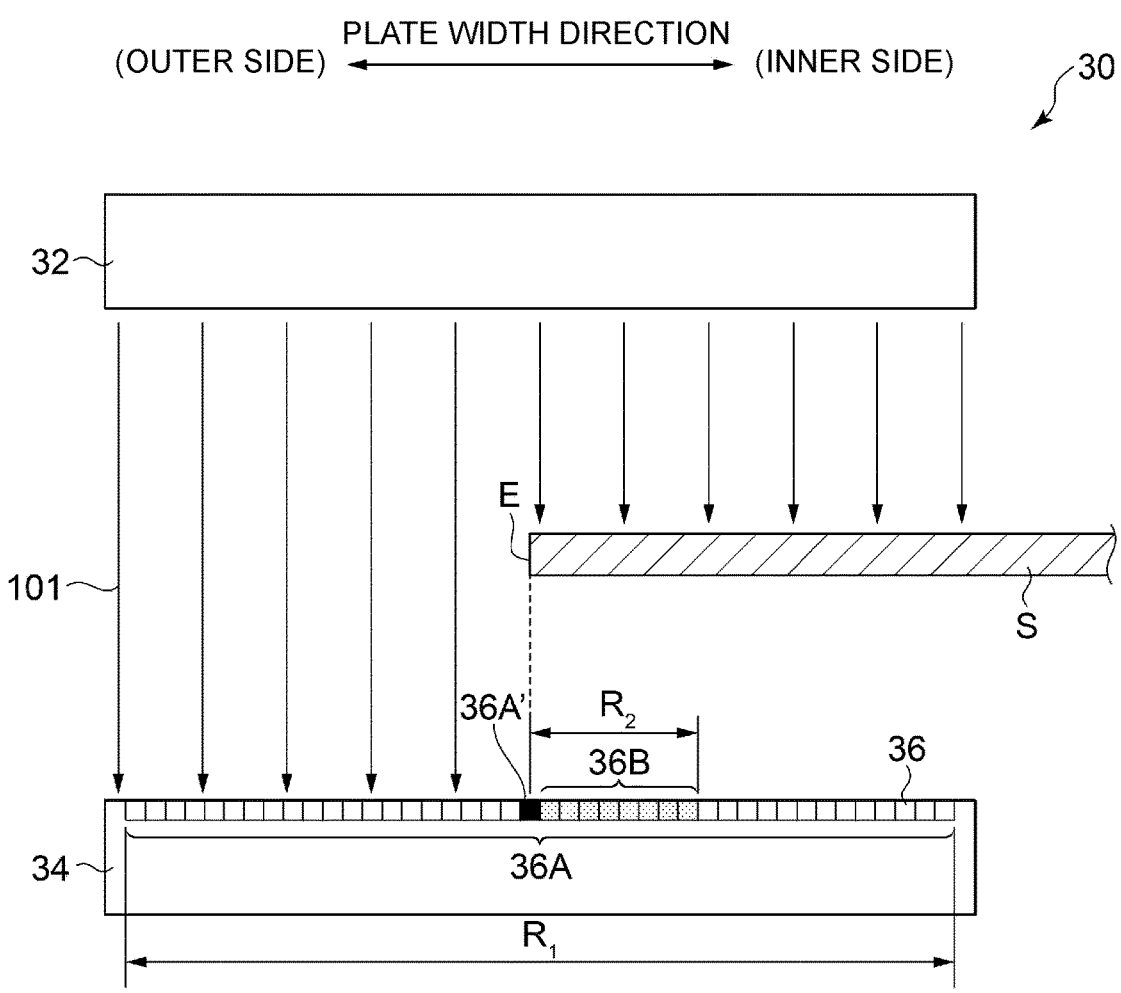
FIG. 3 is a schematic configuration diagram of an edge crack detection apparatus according to an embodiment.

FIGS. 2 and 3 are each a schematic configuration diagram of an edge crack detection apparatus according to an embodiment.

As depicted in FIGS. 1 to 3, the edge crack detection apparatus 100 includes a detection part 30 disposed in the vicinity of an end portion, in the plate-width direction, of the metal plate S to be conveyed, and a processing part 50 for processing the signals from the detection part 30.

The processing part 50 includes a plate edge position determination part 52 for determining the plate edge position of the metal plate S in the plate width direction on the basis of the signals from the detection part 30, and an edge crack detection part 54 for detecting an edge crack of an end portion of the metal plate S in the plate width direction (hereinafter, also referred to as merely an edge portion) on the basis of the signals from the detection part 30.

The processing part 50 includes a calculator including a processor (CPU), a storage device (memory device; RAM and the like), an auxiliary storage part, and an interface, for instance. The processing part 50 is configured to receive signals from the detection part 30 via an interface. The processor is configured to process the accordingly received signals. Furthermore, the processor is configured to process the program expanded in the storage device. Accordingly, the respective functions of the above described functional parts (the plate edge position determination part 52 and the edge crack detection part 54) are realized.

The content of process at the processing part 50 is implemented as a program to be executed by the processor. The program may be stored in the auxiliary storage part. When the program is executed, the program is expanded in the storage part. The processor is configured to read out the program from the storage device, and execute the commands contained in the programs.

As depicted in FIG. 3, the detection part 30 includes a plurality of elements 36 arranged along the plate width direction of the metal plate S. Each of the plurality of elements 36 is configured to be capable of detecting presence or absence of the metal plate S at the position of the element 36 in the plate width direction. The signal indicating the detection result of presence or absence of the metal plate S is sent to the processing part 50.

In some embodiments, the detection part 30 is configured to detect an edge crack using radiation (e.g., X-rays). In the illustrative embodiment depicted in FIG. 3, the detection part 30 includes a radiation receiving part 34 including the plurality of elements 36, and a radiation generation part 32 disposed opposite to the radiation receiving part 34 across the metal plate S. The radiation generation part 32 is configured to generate radiation 101 (X-rays of the like) which radiates towards the plurality of elements 36 of the radiation receiving part 34.

In an embodiment, the plurality of elements 36 are semiconductor elements that output signals upon receiving the radiation 101. Each of the plurality of elements 36 is configured to detect absence of the metal plate S at the position of the element 36 in the plate width direction upon receiving the radiation 101, and detect presence of the metal plate S at the position of the element 36 in the plate width direction when not receiving the radiation 101.

That is, in the region where the metal plate S exists in the plate width direction, the radiation 101 from the radiation generation part 32 is blocked by the metal plate S. Thus, each of the elements 36 positioned in this region does not receive the radiation 101, and thus does not output signals that indicate reception of the radiation 101. Conversely, in the region where the metal plate S does not exist in the plate width direction, the radiation 101 from the radiation generation part 32 is not blocked by the metal plate S. Thus, each of the elements 36 positioned in this region receives the radiation 101, and outputs signals that indicate reception of the radiation 101.

The above described semiconductor elements may be cadmium telluride (CdTe) semiconductor elements. CdTe semiconductor have a high resolution, and thus is likely to appropriately detect the plate edge position and an edge crack of the metal plate S being conveyed at a high speed.

The arrangement pitch of the plurality of elements 36 in the plate width direction is not particularly limited, and may be not smaller than 0.05 mm and not greater than 1 mm, for instance.

(Process Flow of Edge Crack Detection)

Figure 4:
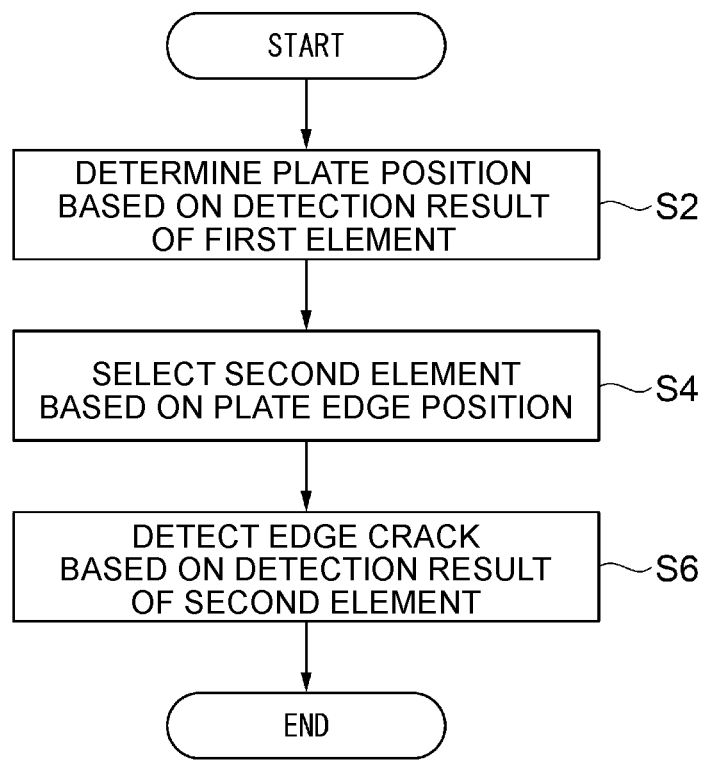
FIG. 4 is a flowchart showing a flow of the process of detecting an edge crack according to an embodiment.

The following description describes the flow of the process of detecting an edge crack by an edge crack detection apparatus 100 according to some embodiments (method of detecting an edge crack). FIG. 4 is a flowchart showing a flow of the process of detecting an edge crack by an edge crack detection apparatus 100 according to some embodiments.

As depicted in FIG. 4, in an embodiment, firstly, the position of the plate edge E of the metal plate S in the plate width direction is determined on the basis of the detection result by each of the plurality of first elements 36A positioned within the first region R1 (see FIG. 3) in the plate width direction, from among the plurality of elements 36 (S2).

With regard to the step 2, a case illustrated in FIG. 3 will be described. In the example illustrated in FIG. 3, of the plurality of first elements 36A, the first element 36A' and the first elements 36A positioned at the inner side of the first element 36A' in the plate width direction (closer to the side of the center line of the metal plate S) each detect presence of the metal plate S at the position of the respective first elements 36A. Meanwhile, of the plurality of first elements 36A, the first elements 36A positioned at the outer side of the first element 36A' in the plate width direction (at the side opposite to the center line of the metal plate S) detect absence of the metal plate S at the position of the respective first elements 36A. Thus, in such a case, it is determined that the plate edge E is positioned at the position of the first element 36A' in the plate width direction.

The length of the first region R1 in the plate width direction is set such that the plate edge E falls within the range of the first region R1 even in a case where the metal plate S meanders to some extent during conveyance. The length of the first region R1 in the plate width direction may be ¼ of the plate width of the metal plate S or longer.

Next, the edge crack detection part 54 selects a plurality of second elements 36B to be used in detection of an edge crack in the subsequent step S6, from among the plurality of elements 36, on the basis of the position of the plate edge E determined in step S2 (S4). The plurality of second elements 36B are positioned within a second region R2 which is narrower than the first region R1 in the plate width direction.

The above described second region R2 may be a region including the position of the plate edge E (that is, the position of the first element 36A'). In an embodiment, as depicted in FIG. 3 for instance, the second region R2 may be a region between the position of the plate edge E and a position offset inward from the position of the plate edge E in the plate width direction. Alternatively, in an embodiment, the second region R2 may be a region between a position offset inward from the position of the plate edge E in the plate width direction and a position offset outward from the position of the plate edge E in the plate width direction.

Furthermore, it is sufficient if the edge crack detection part 54 selects a plurality of second elements to be used in detection of an edge crack on the basis of the position of the plate edge E. The edge crack detection part 54 may always detect all the way up to the most inner element in the plate width direction as the elements at the inner end in the plate width direction belonging to the second region R2. Also in this case, the first region is narrower than the second region.

In the example detected in FIG. 3, of the plurality of elements 36, each of the elements 36 selected as the second element 36B also functions as the first element 36A. That is, in some embodiments, each of the plurality of elements 36 may be configured to be capable of functioning as both of the first element 36A and the second element 36B.

The length of the above described second region R2 in the plate width direction may be set on the basis of the length, in the plate width direction, of an edge crack which may be formed on the metal plate S. For instance, the length of the second region R2 in the plate width direction may be twice the maximum length, in the plate width direction, of an edge crack which is expected to form on the metal plate S, or longer.

Furthermore, the number of the plurality of first elements 36A may be not smaller than 20 times and not greater than 200 times the number of the plurality of second elements 36B.

Next, the edge crack detection part 54 detects an edge crack of the metal plate S on the basis of the detection result by each of the plurality of second elements 36B selected in step S4 (S6).

Figure 5:
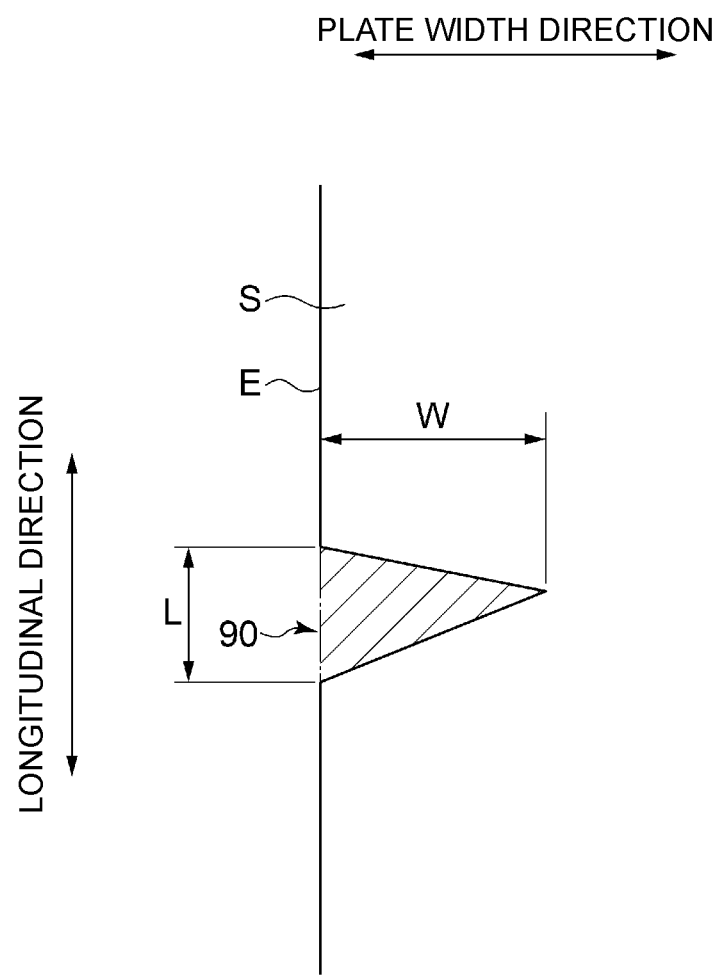
FIG. 5 is a schematic diagram of an edge crack formed on a metal plate.

Herein, FIG. 5 is a schematic diagram of an edge crack (shaded area in FIG. 5) formed on the metal plate S. As depicted in FIG. 5, the edge crack 90 is a defect that forms on an end portion of the metal plate S in the plate width direction. The edge crack 90 normally has a shape recessed inward in the plate width direction from the plate edge E of the metal plate S. The edge crack 90 in FIG. 5 has a width W in the plate width direction of the metal plate S, and a length L in the longitudinal direction of the metal plate S.

In a case where the edge crack 90 (an absent part of the metal plate S) exists on the metal plate S, each of the second elements 36B at a position where the edge crack 90 exists in the plate width direction detects absence of the metal plate at the position. Furthermore, each of the second elements 36B at a position where the edge crack 90 does not exist in the plate width direction detects presence of the metal plate S at the position. Accordingly, it is possible to detect presence or absence of an edge crack at the metal plate S on the basis of the detection results by the plurality of second elements 36B.

According to the above described embodiment, it is possible to detect an edge crack using a small number of second elements 36B selected on the basis of the position of the plate edge E determined from the detection results obtained by the plurality of first elements 36A. Thus, it is possible to reduce the calculation process load compared to a case where a large number of elements are used to detect an edge crack, and it is possible to detect an edge crack efficiently. Furthermore, in the above described embodiment, a relatively small number of second elements 36B are used to detect an edge crack, and thus it is easier to detect an edge crack in a short cycle compared to a case where a large number of elements are used. Thus, it is possible to appropriately detect a small edge crack of the metal plate S being conveyed at a high speed.

In some embodiments, in step S2, the plate edge position determination part 52 obtains the detection result by each of the plurality of first elements 36A and determines the position of the plate edge E on the basis of the detection results, at intervals of a first cycle time T1. Then, in step S6, the edge crack detection part 54 obtains the detection result by each of the plurality of second elements 36B at intervals of a second cycle time T2 which is shorter than the first cycle time T1.

Figure 6:
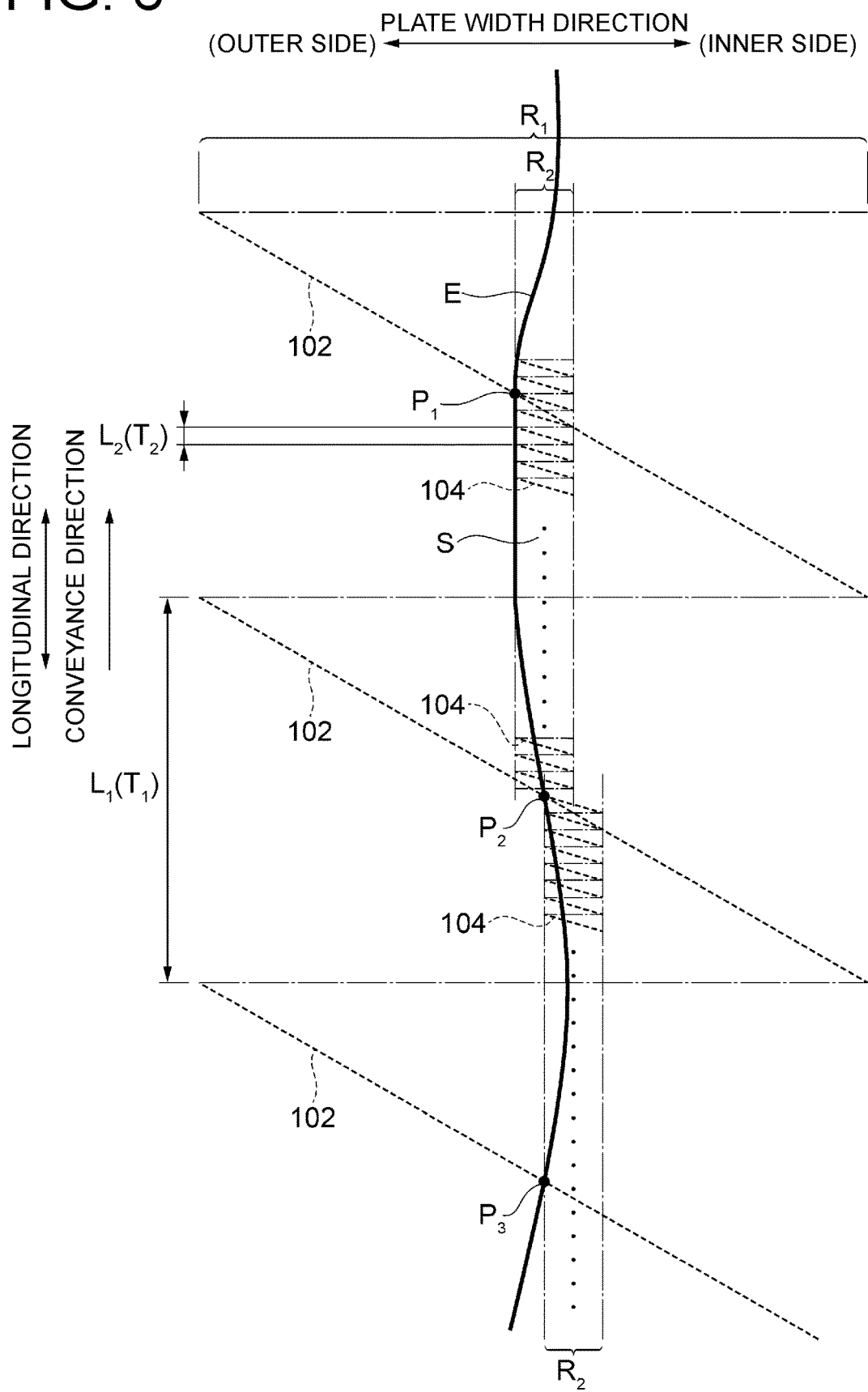
FIG. 6 is a diagram for describing the process of detecting an edge crack according to an embodiment.

FIG. 6 is a diagram for describing the edge crack detection process according to an embodiment, schematically showing the detection position of each of the plurality of elements 36 in the plate width direction and the longitudinal direction of the metal plate S as the detection position moves in the advance direction in accordance with advance of the metal plate S. In FIG. 6, the detection positions by the plurality of first elements 36A are shown in dotted line 102, and the detection positions by the plurality of second elements 36B are shown in dotted line 104. A premise here is that the metal plate S is conveyed at a constant speed V. The metal plate S advances by distance L1 (=V×T1) during the first cycle time T1 and advances by distance L2 (=V×T2) during the second cycle time T2.

In FIG. 6, the plurality of first elements 36A are each configured to detect, in sequence from the first element 36A positioned at the most outer side in the plate width direction, presence or absence of the metal plate S at the position of the first element 36A in the plate width direction. Furthermore, the plurality of second elements 36B are each configured to detect, in sequence from the second element 36B positioned at the most outer side in the plate width direction, presence or absence of the metal plate S at the position of the second element 36B in the plate width direction. In FIG. 6, the second region R2 is the region at the inner side, in the plate width direction, of the position (P1, P2, or the like) at the plate edge E determined by the plurality of first elements 36A.

In a case where the detection result by each of the plurality of first elements 36A is obtained (i.e., the state of each of the plurality of first elements 36A is read in) once every first cycle time T1, as depicted in FIG. 6, the metal plate S advances by distance L1 during the first cycle time T, and thus the plurality of first elements 36A detect presence or absence of the metal plate S at the respective positions within the first region R1 in the plate width direction in the range of the longitudinal direction length L1 of the metal plate S. In the above range of the length L1, normally, a single position of the plate edge (P1, P2 in the drawing) is detected.

Furthermore, in a case where the detection result by each of the plurality of second elements 36B is obtained (i.e., the state of each of the plurality of second elements 36B is read in) once every second cycle time T2, as depicted in FIG. 6, the metal plate S advances by distance L2 during the second cycle time T, and thus the plurality of second elements 36B detect presence or absence of the metal plate S at the respective positions within the second region R2 in the plate width direction in the range of the longitudinal direction length L2 of the metal plate S.

The change of the position of the plate edge E during conveyance of the metal plate S is relatively slow compared to the conveyance speed of the metal plate S. For instance, in a case of a typical rolling mill apparatus, the plate edge position may change only a few millimeters while the metal plate S advances a few meters. In this case, the position of the plate edge E changes gradually, and thus it is possible to detect the change of the position of the plate edge E without shortening the detection cycle considerably. Meanwhile, the size of an edge crack of the metal plate S is considerably small relative to the conveyance speed of the metal plate S. For instance, while a typical conveyance speed in a rolling mill apparatus is several hundred mpm (or several thousand mm/s), the length of an edge crack in the longitudinal direction of the metal plate S is about 0.5 to several mm. Thus, to detect an edge crack without an oversight, it is necessary to shorten the detection cycle to some extent.

In this regard, according to the above described embodiment, the detection result by each of the plurality of first elements 36A is obtained at intervals of the first cycle time that is relatively long, and thus it is possible to suppress an increase in the load of calculation process to determine the position of the plate edge E. Also, the detection result by each of the plurality of second elements 36B is obtained at intervals of the second cycle time that is relatively short, and thus it is possible to detect a small edge crack of the metal plate S being conveyed at a high speed more reliably.

In some embodiments, the second cycle time T2 is not longer than 1/10 of the first cycle time T1. That is, the advance distance L2 of the metal plate S in the second cycle time T2 depicted in FIG. 6 is not longer than 1/10 of the advance distance L1 of the metal plate S in the first cycle time T1.

In this case, the detection result by each of the plurality of first elements 36A is obtained at intervals of the first cycle time T1 that is relatively long, or specifically, ten times or more compared to the second cycle time T2, and thus it is possible to suppress an increase in the load of calculation process to determine the position of the plate edge E. Also, the detection result by each of the plurality of second elements 36B is obtained at intervals of the second cycle time T2 that is relatively short, or specifically, 1/10 or less compared to the first cycle time T1, and thus it is possible to detect a small edge crack of the metal plate S being conveyed at a high speed more reliably.

In some embodiments, in step S2, the plate edge position determination part 52 is configured to obtain the detection results by the plurality of first elements 36A in the first cycle time T1 by reading in the state of the plurality of first elements 36A in sequence along the plate width direction every first cycle time T1. Furthermore, in a case where the state of the plurality of first elements 36A is read in in sequence along the plate width direction from the outer side toward the inner side in the plate width direction every first cycle time T1, the detection position of presence or absence of the metal plate S by the plurality of first elements 36A is as indicated by the dotted line 102 in FIG. 6.

According to the above described embodiment, the detection results by the plurality of first elements 36A are obtained by reading in the state of the plurality of first elements 36A in sequence along the plate width direction at intervals of the first cycle time T1, and thus it is possible to determine the position of the plate edge E of the metal plate S with a relatively simple configuration. For instance, the plate edge position determination part 52 may be implemented as a program of a relatively simple configuration.

In FIG. 6, the detection speed indicated by the dotted line 104 is higher than the detection speed indicated by the dotted line 102. Such a high detection speed is more preferable for detection of an edge crack. The detection speed is not limited to the above. The detection speed of the dotted line 104 may be the same as, or smaller than that of the dotted line 102. Herein, the detection speed refers to "the travel distance (number of elements to be detected)/sampling time".

In some embodiments, in step S6, the edge crack detection part 54 is configured to obtain the detection results by the plurality of second elements 36B in the second cycle time T2 by reading in the state of the plurality of second elements 36B in sequence along the plate width direction at intervals of the second cycle time T1. Furthermore, in a case where the state of the plurality of second elements 36B is read in in sequence along the plate width direction from the outer side toward the inner side in the plate width direction at intervals of the second cycle time T2, the detection position of presence or absence of the metal plate S by the plurality of second elements 36B is as indicated by the dotted line 104 in FIG. 6.

According to the above described embodiment, the detection results by the plurality of second elements 36B are obtained by reading in the state of the plurality of second elements 36B in sequence along the plate width direction at intervals of the second cycle time T2, and thus it is possible to detect an edge crack of the metal plate S with a relatively simple configuration. For instance, it is possible to implement the edge crack detection part 54 as a program of a relatively simple configuration.

Figure 7:
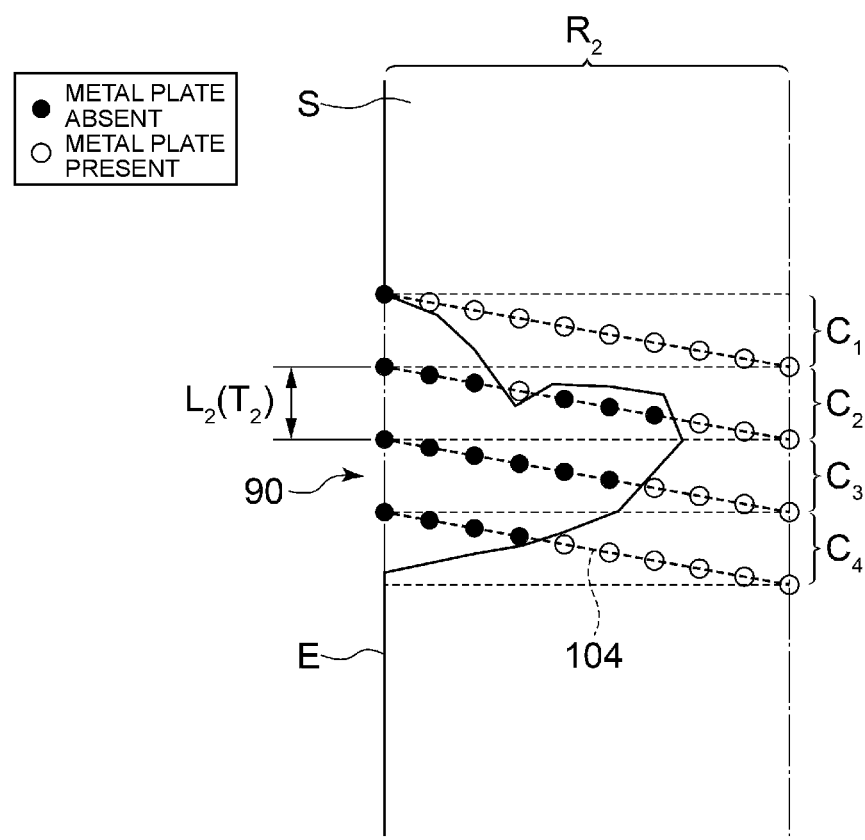
FIG. 7 is an enlarged view of the schematic diagram of FIG. 6, showing a plate edge portion of a metal plate.

FIG. 7 is an enlarged view of the schematic diagram of FIG. 6, showing a plate edge portion of the metal plate S. The dots in the drawings (solid circles and empty circles) each indicate a detection result by corresponding one of the second elements 36B. A solid circle indicates detection of absence of the metal plate S at the position of the corresponding second element 36B in the plate width direction, and an empty circle indicates detection of presence of the metal plate S at the position of the corresponding second element 36B in the plate width direction.

In some embodiments, in step S6, the edge crack detection part 54 is configured to detect an edge crack on the basis of the number of the second elements 36B having detected absence of the metal plate S at the position of the second element 36B in the plate width direction (that is, the number of the solid circles in FIG. 7), from among the plurality of second elements 36B.

The edge crack detection part 54 may be configured to obtain the number of the second elements 36B having detected absence of the metal plate S at the position of the second element 36B in the plate width direction from among the plurality of second elements 36B at intervals of the second cycle time T2, and detect an edge crack on the basis of the number at intervals of the second cycle time T2.

When an edge crack of the metal plate S exists, the second elements 36B corresponding to the position of the edge crack in the plate width direction detect absence of the metal plate S at the position, and the other second elements 36B detect presence of the metal plate S at positions corresponding to the respective other second elements 36B. According to the above described embodiment, it is possible to detect an edge crack of the metal plate S appropriately on the basis of the number of the second elements 36B having detected absence of the metal plate S at the position of the second element 36B in the plate width direction, from among the plurality of second elements 36B.

In some embodiments, in step S6, the edge crack detection part 54 is configured to determine that the metal plate S has an edge crack if each of a predetermined number or more of the second elements 36B arranged continuously detect absence of the metal plate S, from among the plurality of second elements 36B.

For instance, the edge crack detection part 54 may determine that the metal plate S has an edge crack when L or more continuously arranged second elements 36B detect absence of the metal plate S in a case where the total number of the second elements 36B is M.

More specifically, as depicted in FIG. 7 for instance, the edge crack detection part 54 may determine that the metal plate S has an edge crack if five or more second elements 36B detect absence of the metal plate S continuously in a case where the total number of the second elements 36B is ten. In the example illustrated in FIG. 7, in the cycles C1 to C4 of the second cycle time T2, the number of second elements 36B that detect absence of the metal plate S continuously is 1, 3, 6, and 4, respectively. That is, in cycle C3, five or more (specifically, six) second elements 36B detect absence of the metal plate S continuously, and thus it can be determined that the metal plate S has an edge crack at the position corresponding to the cycle C3 in the longitudinal direction.

In some embodiments, in step S6, the edge crack detection part 54 is configured to determine that the metal plate S has an edge crack if a ratio N/M of the number N of the second elements 36B detecting absence of the metal plate S to the number (total) M of the plurality of second elements is not smaller than a predetermined value.

For instance, the edge crack detection part 54 may determine that the metal plate S has an edge crack when the above ratio N/M is not smaller than ½. For instance, in the example depicted in FIG. 7, the total number (M) of the second elements 36B is ten. Furthermore, in the cycles C1 to C4 of the second cycle time T2, the number (N) of the second elements 36B that detect absence of the metal plate S continuously is 1, 6, 6, and 4, respectively. Thus, in the cycles C2 and C3, N/M is not smaller than ½, and thereby it is possible to determine that the metal plate S has an edge crack at the positions corresponding to the cycles C2 and C3 in the longitudinal direction.

Figure 8:
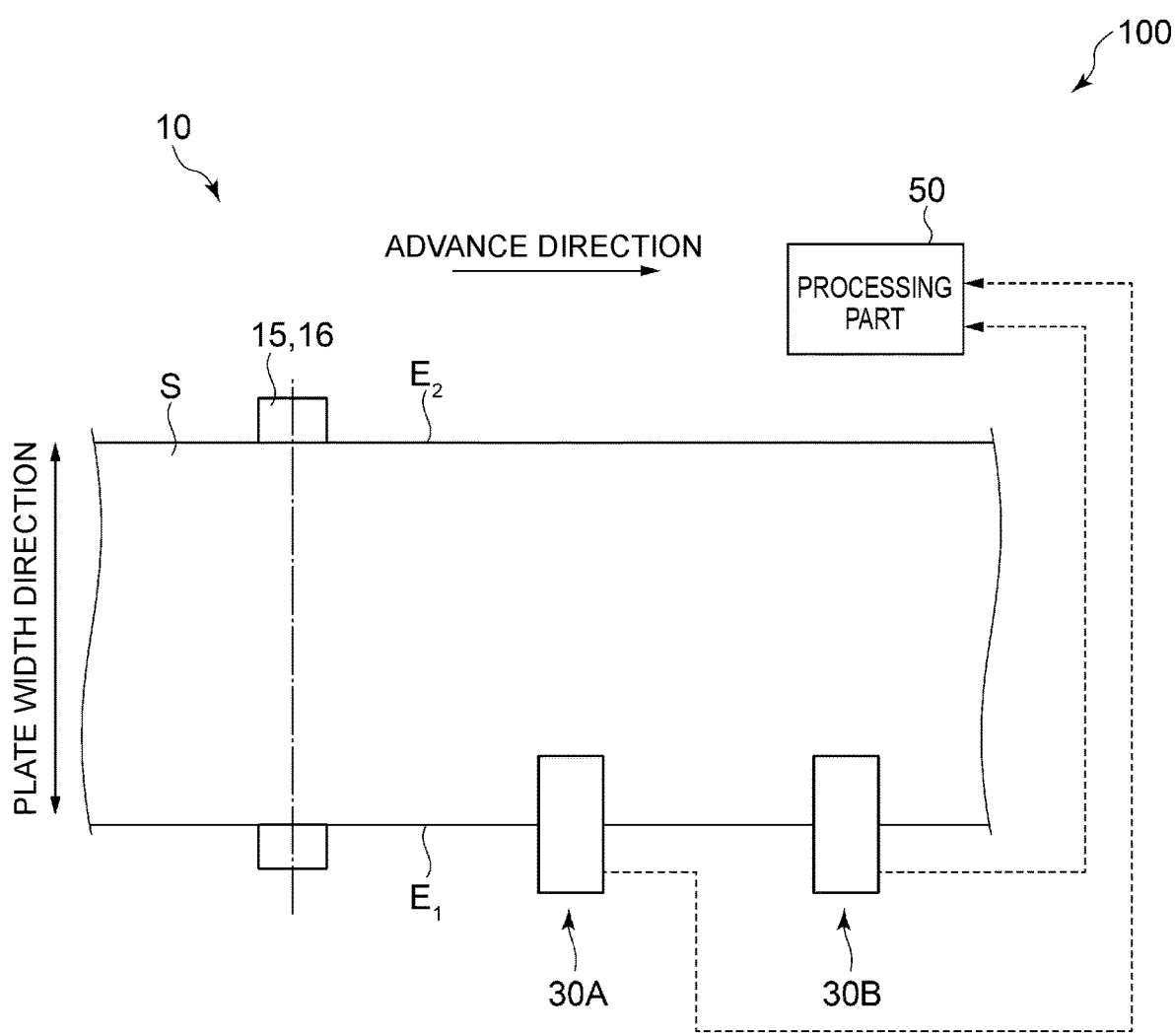
FIG. 8 is a schematic configuration diagram of an edge crack detection apparatus according to an embodiment.
Figure 9:
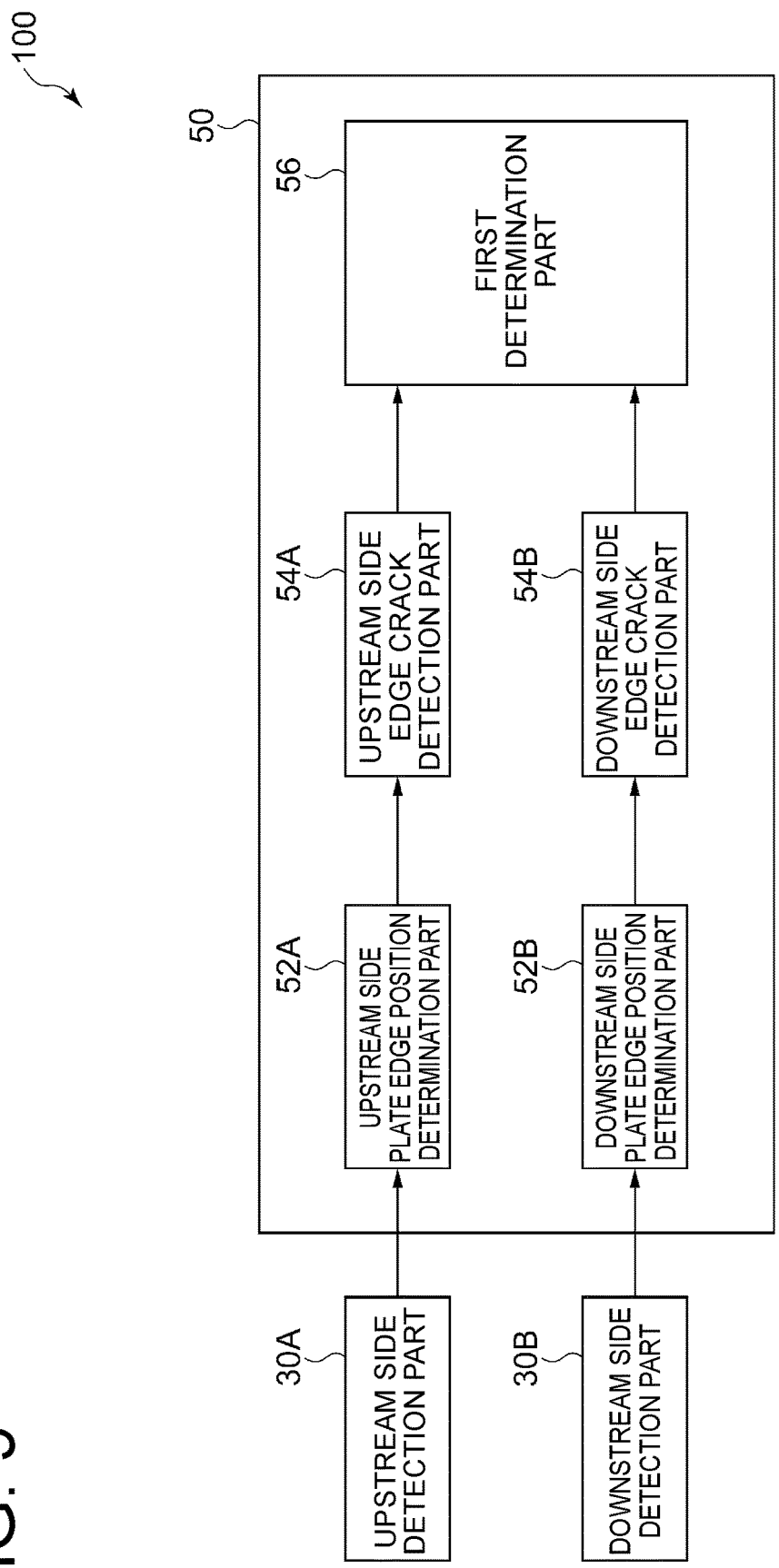
FIG. 9 is a schematic configuration diagram of an edge crack detection apparatus according to an embodiment.

FIGS. 8 and 9 are each a schematic configuration diagram of an edge crack detection apparatus 100 according to an embodiment. FIG. 8 is a planar view of the vicinity of the rolling mill stand 10 of the rolling mill facility 1.

As depicted in FIG. 8, in an embodiment, at the side of the first end E1 of the metal plate S in the plate width direction, a plurality of detection parts 30 (the upstream side detection part 30A and the downstream side detection part 30B) are disposed at different positions in the advance direction of the metal plate S. Furthermore, as depicted in FIG. 9, the processing part 50 includes a plurality of plate edge position determination parts 52 and a plurality of edge crack detection parts 54 disposed corresponding to the respective detection parts 30. Specifically, an upstream side plate edge position determination part 52A and an upstream side edge crack detection part 54A are provided corresponding to the upstream side detection part 30A, and a downstream side plate edge position determination part 52B and a downstream side edge crack detection part 54B are provided corresponding to the downstream side detection part 30B.

The upstream side edge crack detection part 54A is configured to determine possibility of existence of an edge crack on the metal plate S on the basis of whether the second element 36B positioned at the inner side of the plate edge E1 determined by the upstream side plate edge position determination part 52A detects absence of the metal plate S, from among the plurality of second elements 36B of the upstream side detection part 30A. The downstream side edge crack detection part 54B is configured to determine possibility of existence of an edge crack on the metal plate S on the basis of whether the second element 36B positioned at the inner side of the plate edge E1 determined by the downstream side plate edge position determination part 52B detects absence of the metal plate S, from among the plurality of second elements 36B of the downstream side detection part 30B.

The processing part 50 includes a first determination part 56 configured to determine whether the metal plate S has an edge crack on the basis of the determination results by the upstream side edge crack detection part 54A and the downstream side edge crack detection part 54B. The first determination part 56 is configured to determine that the metal plate S has an edge crack when only one of the upstream side edge crack detection part 54A or the downstream side edge crack detection part 54B determines that there is a possibility of an edge crack at the same time.

Figure 10:
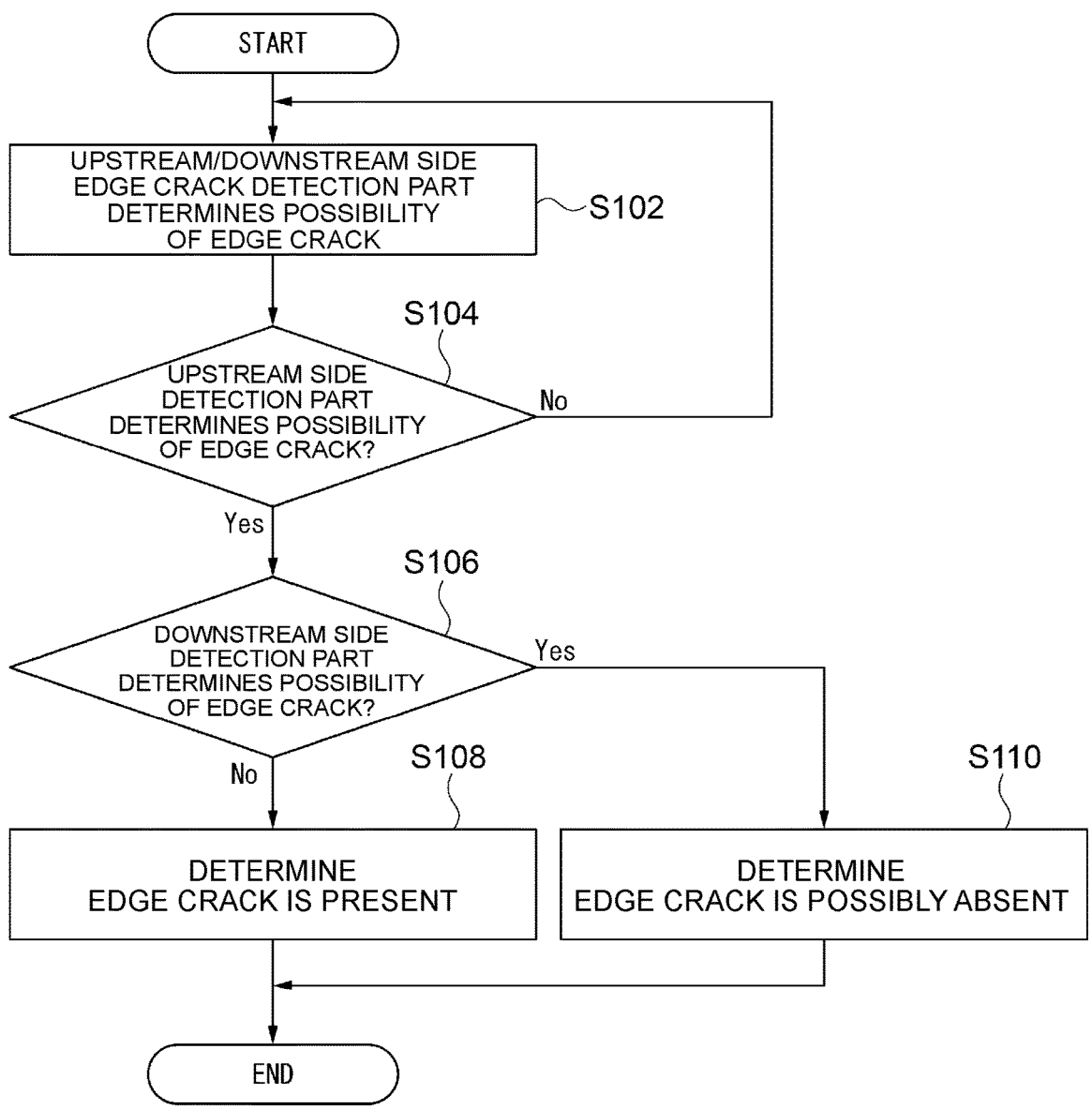
FIG. 10 is a flowchart showing an example of the determination process by the first determination part.

FIG. 10 is a flowchart showing an example of the determination process by the first determination part 56. Firstly, as described above, each of the upstream side edge crack detection part 54A and the downstream side edge crack detection part 54B detects the possibility of existence of an edge crack on the metal plate S (S102). As a result, if the upstream side edge crack detection part 54A determines that there is a possibility of an edge crack of the metal plate S (S104 in YES), the first determination part 56 determines whether the downstream side edge crack detection part 54B has determined that there is a possibility of an edge crack of the metal plate S at the same time as the determination by the upstream side edge crack detection part 54A in step S104 (S106).

In a case where the downstream side edge crack detection part 54B has not determined that there is a possibility of an edge crack on the metal plate S at the same time (No in S106), it is determined that the metal plate S has an edge crack (S108), and the flow is completed. Conversely, in a case where the downstream side edge crack detection part 54B has determined that there is a possibility of an edge crack of the metal plate S (Yes in S106), it is determined that the metal plate S may not have an edge crack (S110), and the flow is completed.

The first determination part 56 may be configured to determine that meandering (oscillation in the plate width direction) has occurred on the metal plate S instead of an edge crack when both of the upstream side edge crack detection part 54A and the downstream side edge crack detection part 54B determine that there is a possibility of an edge crack at the same time (Yes in S106).

Alternatively, the first determination part 56 may be configured to determine that meandering (oscillation in the plate width direction) has occurred on the metal plate S instead of an edge crack when both of the upstream side edge crack detection part 54A and the downstream side edge crack detection part 54B determine that there is a possibility of an edge crack of the same size in the plate width direction or the longitudinal direction of the metal plate S in step S106 at the same time.

In the above steps S102 to S110, the same description is still applicable when the upstream side edge crack detection part 54A and the downstream side edge crack detection part 54B are switched.

According to the above described embodiment, it is determined that the metal plate S has an edge crack when only one of the upstream side edge crack detection part 54A or the downstream side edge crack detection part 54B determines that there is a possibility of an edge crack at the same time, and thus it is possible to suppress erroneous determination regarding presence and absence of an edge crack. For instance, it is possible to suppress wrongly determining existence of an edge crack when meandering is actually occurring on the metal plate S.

Figure 11:
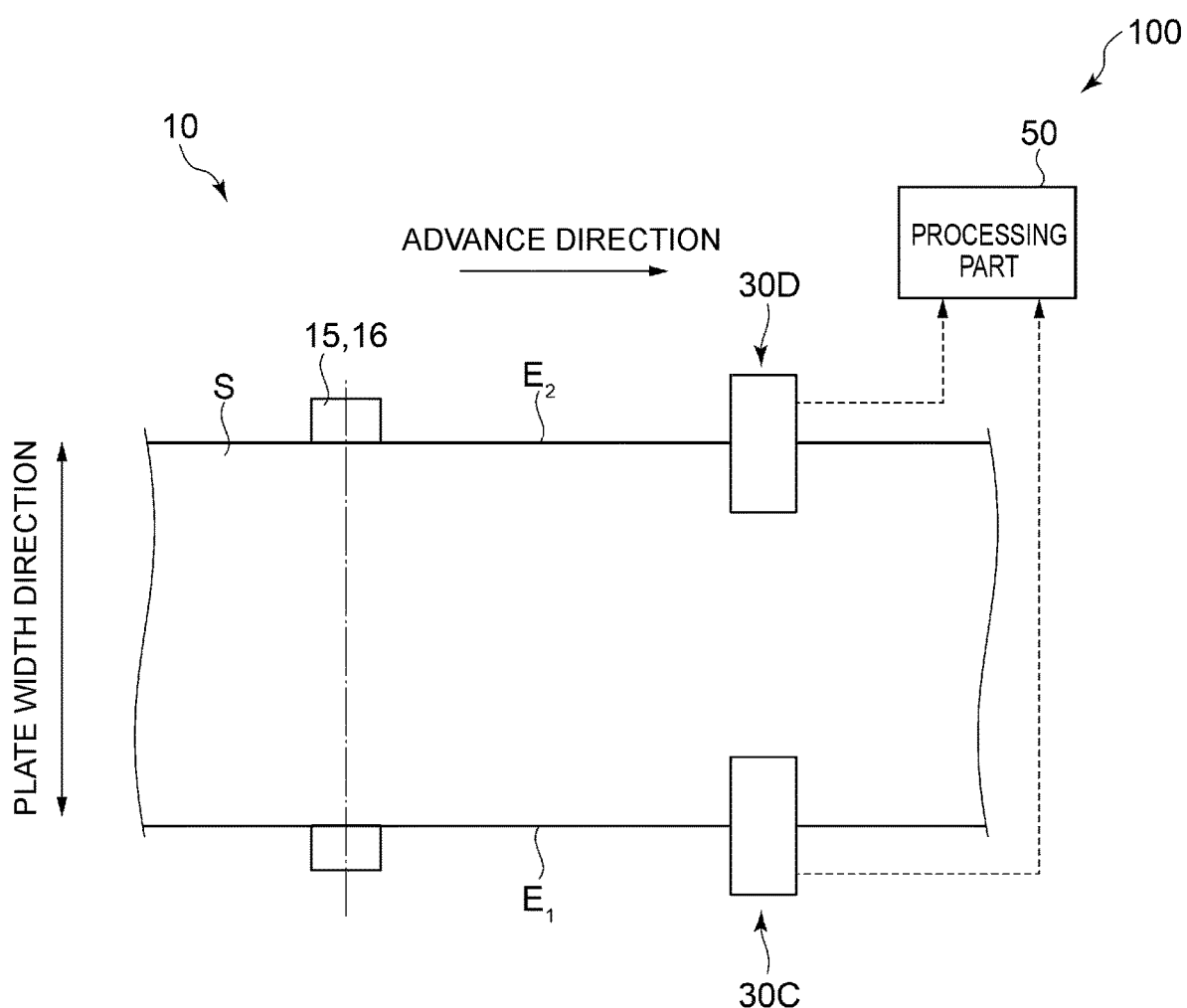
FIG. 11 is a schematic configuration diagram of an edge crack detection apparatus according to an embodiment.
Figure 12:
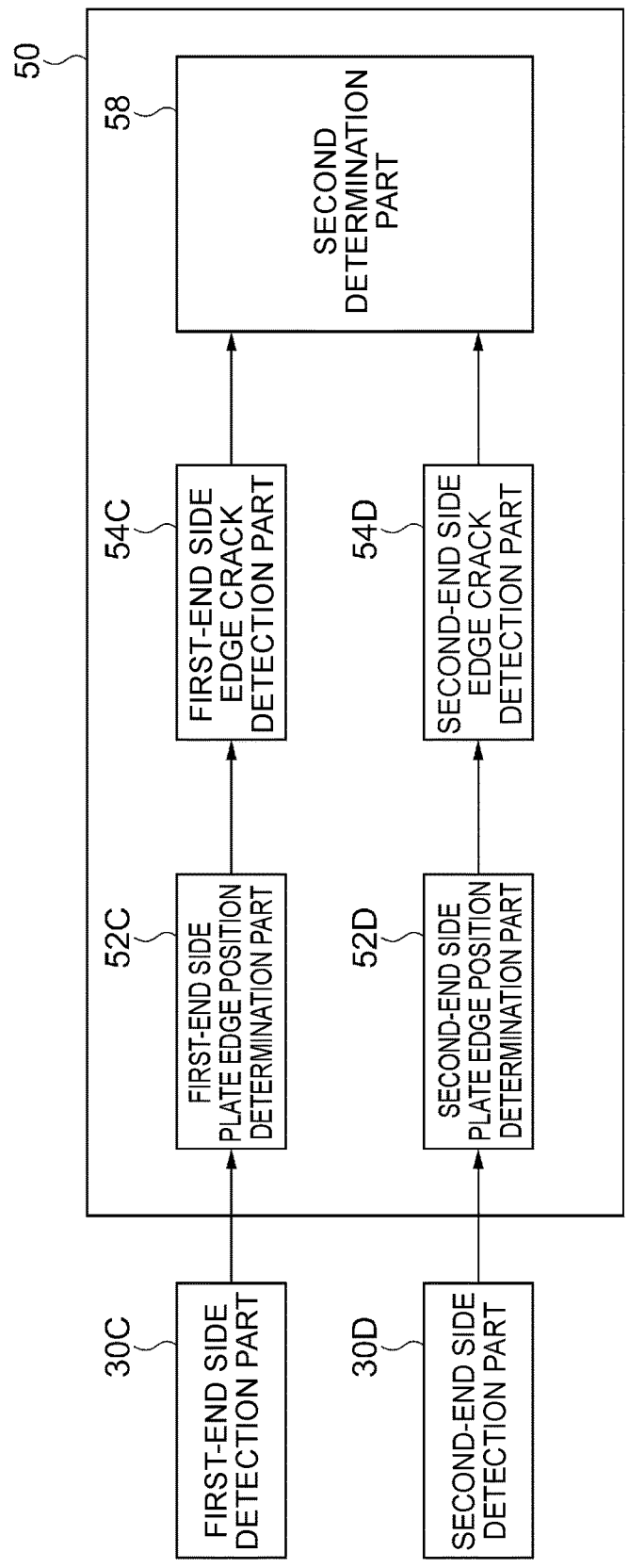
FIG. 12 is a schematic configuration diagram of an edge crack detection apparatus according to an embodiment.

FIGS. 11 and 12 are each a schematic configuration diagram of an edge crack detection apparatus 100 according to an embodiment. FIG. 11 is a planar view of the vicinity of the rolling mill stand 10 of the rolling mill facility 1.

As depicted in FIG. 11, in an embodiment, at the side of the first end E1 and the side of the second end E2 of the metal plate S in the plate width direction, detection parts 30 (the first-end side detection part 30C and the second-end side detection part 30D) are disposed, respectively. Furthermore, as depicted in FIG. 12, the processing part 50 includes a plurality of plate edge position determination parts 52 and a plurality of edge crack detection parts 54 disposed corresponding to the respective detection parts 30. Specifically, a first-end side plate edge position determination part 52C and a first-end side edge crack detection part 54C are provided corresponding to the first-end side detection part 30C, and a second-end side plate edge position determination part 52D and a second-end side edge crack detection part 54D are provided corresponding to the second-end side detection part 30D.

The first-end side edge crack detection part 54C is configured to determine possibility of existence of an edge crack on the metal plate S on the basis of whether the second element 36B positioned at the inner side of the plate edge E1 determined by the first-end-side plate edge position determination part 52C detects absence of the metal plate S, from among the plurality of second elements 36B of the first-end side detection part 30C. The second-end side edge crack detection part 54D is configured to determine possibility of existence of an edge crack on the metal plate S on the basis of whether the second element 36B positioned at the inner side of the plate edge E2 determined by the second-end side plate edge position determination part 52D detects absence of the metal plate S, from among the plurality of second elements 36B of the second-end side detection part 30D.

The processing part 50 includes a second determination part 58 configured to determine whether the metal plate S has an edge crack on the basis of the determination results by the first-end side edge crack detection part 54C and the second-end side edge crack detection part 54D. The second determination part 58 is configured to determine that the metal plate S has an edge crack if the first-end side edge crack detection part 54C determines that there is a possibility of an edge crack and the second element 36B of the second-end side edge crack detection part 54D positioned at the outer side of the position of the plate edge E2 in the plate width direction does not detect presence of the metal plate S at the same time.

Figure 13:
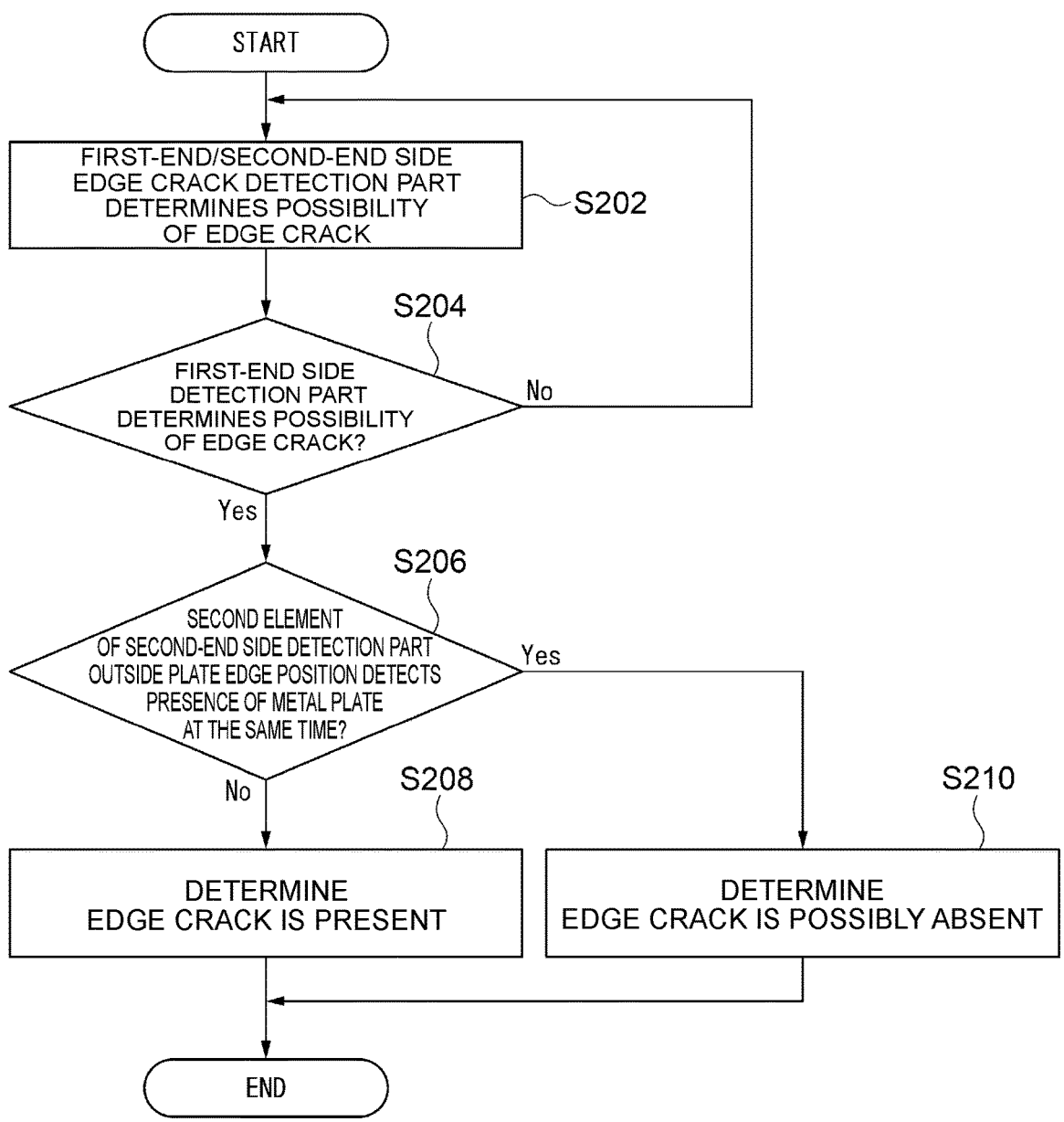
FIG. 13 is a flowchart showing an example of the determination process of the second determination part.

FIG. 13 is a flow chart showing an example of the determination process of the second determination part 58. Firstly, as described above, each of the first-end side edge crack detection part 54C and the second-end side edge crack detection part 54D detects the possibility of existence of an edge crack on the metal plate S (S202). As a result, if the first-end side edge crack detection part 54C determines that there is a possibility of an edge crack of the metal plate S (S204 in YES), the second determination part 58 determines whether, at the second-end side edge crack detection part 54D, the second element 36B positioned at the outer side of the position of the plate edge E2 in the plate width direction has detected presence of the metal plate S at the same time as the determination by the first-end side edge crack detection part 54C in step S204 (S206).

If the second-end side edge crack detection part 54D determines that the second element 36B positioned at the outer side of the position of the plate edge E2 in the plate width direction does not detect presence of the metal plate S at the same time (No in S206), it is determined that the metal plate S has an edge crack (S208), and the flow is completed. Conversely, if the second-end side edge crack detection part 54D determines that the second element 36B positioned at the outer side of the position of the plate edge E2 in the plate width direction has detected presence of the metal plate at the same time (Yes in S206), it is determined that there is a possibility that the metal plate S does not have an edge crack (S210), and the flow is completed.

The second determination part 58 may be configured to determine that meandering (oscillation in the plate width direction) has occurred on the metal plate S instead of an edge crack if the first-end side edge crack detection part 54C determines that there is a possibility of an edge crack and the second-end side edge crack detection part 54D determines that the second element 36B positioned at the outer side of the position of the plate edge E2 in the plate width direction detects presence of the metal plate S at the same time (Yes in S206).

Alternatively, the second determination part 58 may be configured to determine that meandering (oscillation in the plate width direction) has occurred on the metal plate S instead of an edge crack when both of the first-end side edge crack detection part 54C and the second-end side edge crack detection part 54D determine offset of the plate edge E1 and the plate edge E2 toward the same direction at the same time in step S206.

In the above steps S202 to S210, the same description is still applicable when the first-end side edge crack detection part 54C and the second-end side edge crack detection part 54D are switched.

According to the above described embodiment, it is determined that the metal plate S has an edge crack when only one of the upstream side edge crack detection part 54A or the downstream side edge crack detection part 54B determines that there is a possibility of an edge crack at the same time, and thus it is possible to suppress erroneous determination regarding presence or absence of an edge crack. For instance, it is possible to suppress wrongly determining existence of an edge crack when meandering is actually occurring on the metal plate S.

According to the above described embodiment, it is determined that the metal plate S has an edge crack if the first-end side edge crack detection part 54C determines that there is a possibility of an edge crack and the second-end side edge crack detection part 54D determines that the second element 36B positioned at the outer side of the position of the plate edge E2 in the plate width direction does not detect presence of the metal plate S at the same time, and thus it is possible to suppress erroneous determination regarding presence or absence of an edge crack. For instance, it is possible to suppress wrongly determining existence of an edge crack when meandering is actually occurring on the metal plate S.

The overview of an edge crack detection apparatus, a rolling mill facility, and an edge crack detection method according to some embodiments will be described below.

(1) According to at least one embodiment of the present invention, an edge crack detection apparatus for detecting an edge crack of a metal plate being conveyed includes: a detection part including a plurality of elements arranged along a plate width direction of the metal plate, each of the plurality of elements being configured to be capable of detecting presence or absence of the metal plate at a position of the element in the plate width direction; a plate edge position determination part configured to determine a plate edge position of the metal plate in the plate width direction on the basis of a detection result of each of a plurality of first elements positioned within a first region in the plate width direction, from among the plurality of elements; and an edge crack detection part configured to detect an edge crack of the metal plate on the basis of a detection result of each of a plurality of second elements selected on the basis of the plate edge position and positioned within a second region which is narrower than the first region in the plate width direction, from among the plurality of elements.

With the above configuration (1), it is possible to detect an edge crack using a small number of elements (fewer second elements than first elements) selected on the basis of the plate edge position determined from the detection results by the plurality of first elements. Thus, it is possible to reduce the calculation process load compared to a case where a large number of first elements are used to detect an edge crack, and it is possible to detect an edge crack efficiently. Furthermore, with the above configuration (1), a relatively small number of second elements are used to detect an edge crack, and thus it is easier to detect an edge crack in a short cycle compared to a case where a large number of elements are used. Thus, it is possible to appropriately detect a small edge crack of a metal plate being conveyed at a high speed.

(2) In some embodiments, in the above configuration (1), the plate edge position determination part is configured to obtain the detection result by each of the plurality of first elements at intervals of a first cycle time and determine the plate edge position on the basis of the detection result, and the edge crack detection part is configured to obtain the detection result by each of the plurality of second elements at intervals of a second cycle time which is shorter than the first cycle time.

While the change of the position of the plate edge during conveyance of the metal plate is relatively slow compared to the conveyance speed of the metal plate, the size of an edge crack is small relative to the conveyance speed of the metal plate. In this regard, with the above configuration (2), the detection result by each of the plurality of first elements is obtained at intervals of the first cycle time that is relatively long, and thus it is possible to suppress an increase in the load of calculation process for determining the position of the plate edge. Also, the detection result by each of the plurality of second elements is obtained at intervals of the second cycle time that is relatively short, and thus it is possible to detect a small edge crack of the metal plate being conveyed at a high speed, more reliably.

(3) In some embodiments, in the above configuration (2), the second cycle time is not longer than $\frac{1}{10}$ of the first cycle time.

With the above configuration (3), the detection result by each of the plurality of first elements is obtained at intervals of the first cycle time that is relatively long, or specifically, that is ten times or more compared to the second cycle time, and thus it is possible to suppress an increase in the load of calculation process for determining the position of the plate edge. Also, the detection result by each of the plurality of second elements is obtained at intervals of the second cycle time that is relatively short, or specifically, that is $\frac{1}{10}$ or less compared to the first cycle time, and thus it is possible to detect a small edge crack of the metal plate being conveyed at a high speed more reliably.

(4) In some embodiments, in the above configuration (2) or (3), the plate edge position determination part is configured to read in a state of the plurality of first elements in sequence along the plate width direction at intervals of the first cycle time to obtain the detection result by the plurality of first elements in the first cycle time.

With the above configuration (4), the detection results by the plurality of first elements are obtained by reading in the state of the plurality of first elements in sequence along the plate width direction at intervals of the first cycle time, and thus it is possible to determine the position of the plate edge of the metal plate with a relatively simple configuration.

(5) In some embodiments, in any one of the above configurations (2) to (4), the edge crack detection part is configured to read in a state of the plurality of second elements in sequence along the plate width direction at intervals of the second cycle time to obtain the detection result by the plurality of second elements in the second cycle time.

With the above configuration (5), the detection results by the plurality of second elements are obtained by reading in the state of the plurality of second elements in sequence along the plate width direction at intervals of the second cycle time, and thus it is possible to detect an edge crack of the metal plate with a relatively simple configuration.

(6) In some embodiments, in any one of the above configurations (1) to (5), the edge crack detection part is configured to detect the edge crack on the basis of the number of the second element detecting absence of the metal plate at a position of the second element in the plate width direction, from among the plurality of second elements.

When an edge crack of the metal plate exists, the second elements corresponding to the position of the edge crack in the plate width direction detect absence of the metal plate at the position, and the other second elements detect presence of the metal plate at positions corresponding to the respective other second elements. With the above configuration (6), it is possible to detect an edge crack of the metal plate appropriately on the basis of the number of the second elements having detected absence of the metal plate at the same position of the second element in the plate width direction, from among the plurality of second elements.

(7) In some embodiments, in the above configuration (6), the edge crack detection part is configured to determine that the metal plate has the edge crack if each of a predetermined number or more second elements which are arranged continuously detect absence of the metal plate, from among the plurality of second elements.

With the above configuration (7), it is possible to detect an edge crack of the metal plate appropriately on the basis of detection of absence of the metal plate at a position in the plate width direction corresponding to the second element by each of a predetermined number or more second elements continuously arranged, from among the plurality of second elements.

(8) In some embodiments, in the above configuration (6) or (7), the edge crack detection part is configured to determine that the metal plate has the edge crack if a ratio of the number of the second elements detecting absence of the metal plate to the number of the plurality of second elements is not smaller than a predetermined value.

With the above configuration (8), it is possible to detect an edge crack of the metal plate appropriately on the basis of that a ratio of the number of the second elements detecting absence of the metal plate to the number of the plurality of second elements is not smaller than a predetermined value.

(9) In some embodiments, in any one of the above configurations (1) to (8), the second region is a region between the plate edge position and a position offset inward in the plate width direction from the plate edge position.

An edge crack of a metal plate forms within a positional range at the inner side from the plate edge of the metal plate. With the above configuration (9), it is possible to detect an edge crack of the metal plate appropriately on the basis of the detection results by the plurality of second elements within the second region being a region at the inner side of the plate edge position.

(10) In some embodiments, in any one of the above configurations (1) to (9), the edge crack detection part is configured to determine a possibility of existence of the edge crack of the metal plate on the basis of whether the second element positioned at an inner side of the plate edge position detects absence of the metal plate, from among the plurality of second elements. The edge crack detection apparatus includes: an upstream side edge crack detection part being the edge crack detection part; a downstream side edge crack detection part being the edge crack detection part and being disposed at a position different from that of the upstream side edge crack detection part in a conveyance direction of the metal plate; and a first determination part configured to determine that the metal plate has the edge crack if, at the same time, only one of the upstream side edge crack detection part or the downstream side edge crack detection part determines that there is a possibility of the edge crack.

With the above configuration (10), it is determined that the metal plate has an edge crack when only one of the upstream side edge crack detection part or the downstream side edge crack detection part positioned at different positions in the conveyance direction of the metal plate determines that there is a possibility of an edge crack at the same time, and thus it is possible to suppress erroneous determination regarding presence or absence of an edge crack.

(11) In some embodiments, in any one of the above configurations (1) to (8), the edge crack detection part is configured to determine a possibility of existence of the edge crack of the metal plate on the basis of whether the second element positioned at an inner side of the plate edge position detects absence of the metal plate, from among the plurality of second elements. The edge crack detection apparatus includes: a first-end side edge crack detection part being the edge crack detection part; a second-end side edge crack detection part being the edge crack detection part and being disposed at an opposite side to the first-end side edge crack detection part across the metal plate in the plate width direction; and a second determination part configured to determine that the metal plate has the edge crack if, at the same time, the first-end side edge crack detection part determines that there is a possibility of the edge crack and the second element of the second-end side edge crack detection part positioned at an outer side of the plate edge position in the plate width direction does not detect presence of the metal plate.

With the above configuration (11), it is determined that the metal plate has an edge crack if the first-end side edge crack detection part determines that there is a possibility of an edge crack and the second element of the second-end side edge crack detection part positioned at the outer side of the position of the plate edge in the plate width direction does not detect presence of the metal plate at the same time, and thus it is possible to suppress erroneous determination regarding presence or absence of an edge crack.

(12) In some embodiments, in any one of the above configurations (1) to (11), the detection part includes: a radiation receiving part including the plurality of elements; and a radiation generation part disposed at an opposite side to the radiation receiving part across the metal plate and configured to generate radiation which radiates toward the radiation receiving part. Each of the plurality of elements is configured to detect absence of the metal plate at a position of the element in the plate width direction when receiving the radiation, and detect presence of the metal plate at the position of the element in the plate width direction when not receiving the radiation.

The vicinity of the processing apparatus (e.g., rolling mill apparatus) for a metal plate is often a harsh environment where rolling mill oil and fume scatter in large quantity, the apparatuses vibrate, and the place is dark, for instance. In this regard, with the above configuration (12), an edge crack sensor which detects an edge crack by using radiation is used, and thus it is possible to detect an edge crack in the vicinity of a processing apparatus under a harsh environment.

(13) According to at least one embodiment of the present invention, a rolling mill facility includes: a rolling mill apparatus for rolling a metal plate; and the edge crack detection apparatus according to any one of the above (1) to (12) configured to detect an edge crack at an end portion, in the plate width direction, of the metal plate during rolling by the rolling mill apparatus.

With the above configuration (13), it is possible to detect an edge crack using a small number of second elements (fewer second elements than first elements) selected on the basis of the plate edge position determined from the detection results by the plurality of first elements. Thus, it is possible to reduce the calculation process load compared to a case where a large number of first elements are used to detect an edge crack, and it is possible to detect an edge crack efficiently. Furthermore, with the above configuration (13), a relatively small number of second elements are used to detect an edge crack, and thus it is easier to detect an edge crack in a short cycle compared to a case where a large number of elements are used. Thus, it is possible to appropriately detect a small edge crack of a metal plate being conveyed at a high speed.

(14) According to at least one embodiment of the present invention, a method of detecting an edge crack of a metal plate being conveyed, using a detection part including a plurality of elements arranged along a plate width direction of the metal plate, each of the plurality of elements being configured to be capable of detecting presence or absence of the metal plate at a position of the element in the plate width direction, includes: a step of determining a plate edge position of the metal plate in the plate width direction on the basis of a detection result of each of a plurality of first elements positioned within a first region in the plate width direction, from among the plurality of elements; a step of selecting, on the basis of the determined plate edge position, a plurality of second elements positioned within a second region which is narrower than the first region in the plate width direction, from among the plurality of elements; and a step of detecting an edge crack of the metal plate on the basis of a detection result by each of the plurality of the selected second elements.

According to the above method (14), it is possible to detect an edge crack using a small number of second elements (fewer second elements than first elements) selected on the basis of the plate edge position determined from the detection results by the plurality of first elements. Thus, it is possible to reduce the calculation process load compared to a case where a large number of first elements are used to detect an edge crack, and it is possible to detect an edge crack efficiently. Furthermore, according to the above method (14), a relatively small number of second elements are used to detect an edge crack, and thus it is easier to detect an edge crack in a short cycle compared to a case where a large number of elements are used. Thus, it is possible to appropriately detect a small edge crack of a metal plate being conveyed at a high speed.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Reference Signs List

1 ROLLING MILL FACILITY

2 Rolling mill apparatus
4 Unwinder
6 Input-side pinch roll
10 Rolling mill stand
12 Output-side pinch roll
14 Rewinder
15 Work roll
16 Work roll
17 Intermediate roll
18 Intermediate roll
19 Backup roll
20 Backup roll
30 Detection part
30A Upstream side detection part
30B Downstream side detection part
30C First-end side detection part
30D Second-end side detection part
32 Radiation generation part
34 Radiation receiving part
36 Element
36A, 36A' First element
36B Second element
50 Processing part
52 Plate edge position determination part
52A Upstream side plate edge position determination part
52B Downstream side plate edge position determination part
52C First-end side plate edge position determination part
52D Second-end side plate edge position determination part
54 Edge crack detection part
54A Upstream side edge crack detection part
54B Downstream side edge crack detection part
54C First-end side edge crack detection part
54D Second-end side edge crack detection part
56 First determination part
58 Second determination part
100 Edge crack detection apparatus 101 Radiation
E Plate edge
E1 First end
E2 Second end
R1 First region
R2 Second region
S Metal plate

The invention claimed is:

1. An edge crack detection apparatus for detecting an edge crack of a metal plate being conveyed, the edge crack detection apparatus comprising:
    a detection part including a plurality of elements arranged along a plate width direction of the metal plate, each of the plurality of elements being configured to be capable of detecting presence or absence of the metal plate at a position of the element in the plate width direction;
    a plate edge position determination part configured to determine a plate edge position of the metal plate in the plate width direction on the basis of a detection result of each of a plurality of first elements positioned within a first region in the plate width direction, from among the plurality of elements; and
        an edge crack detection part configured to detect an edge crack of the metal plate on the basis of a detection result of each of a plurality of second elements selected on the basis of the plate edge position and positioned within a second region which is narrower than the first region in the plate width direction, from among the plurality of elements,
    wherein the edge crack detection part is configured to determine a possibility of existence of the edge crack of the metal plate on the basis of whether the second element positioned at an inner side of the plate edge position detects absence of the metal plate, from among the plurality of second elements,
    wherein the edge crack detection apparatus includes:
        an upstream side edge crack detection part being the edge crack detection part;
        a downstream side edge crack detection part being the edge crack detection part and being disposed at a position different from that of the upstream side edge crack detection part in a conveyance direction of the metal plate; and
        a first determination part configured to determine that the metal plate has the edge crack if, at the same time, only one of the upstream side edge crack detection part or the downstream side edge crack detection part determines that there is a possibility of the edge crack.

2. The edge crack detection apparatus according to claim 1,
    wherein the plate edge position determination part is configured to obtain the detection result by each of the plurality of first elements at intervals of a first cycle time and determine the plate edge position on the basis of the detection result, and
    wherein the edge crack detection part is configured to obtain the detection result by each of the plurality of second elements at intervals of a second cycle time which is shorter than the first cycle time.

3. The edge crack detection apparatus according to claim 2,
    wherein the second cycle time is not longer than 1/10 of the first cycle time.

4. The edge crack detection apparatus according to claim 2,
    wherein the plate edge position determination part is configured to read in a state of the plurality of first elements in sequence along the plate width direction at intervals of the first cycle time to obtain the detection result by the plurality of first elements in the first cycle time.

5. The edge crack detection apparatus according to claim 2,
    wherein the edge crack detection part is configured to read in a state of the plurality of second elements in sequence along the plate width direction at intervals of the second cycle time to obtain the detection result by the plurality of second elements in the second cycle time.

6. The edge crack detection apparatus according to claim 1,
    wherein the edge crack detection part is configured to detect the edge crack on the basis of the number of the second element detecting absence of the metal plate at a position of the second element in the plate width direction, from among the plurality of second elements.

7. The edge crack detection apparatus according to claim 6,
    wherein the edge crack detection part is configured to determine that the metal plate has the edge crack if each of a predetermined number or more second elements which are arranged continuously detect absence of the metal plate, from among the plurality of second elements.

8. The edge crack detection apparatus according to claim 6,
    wherein the edge crack detection part is configured to determine that the metal plate has the edge crack if a ratio of the number of the second elements detecting absence of the metal plate to the number of the plurality of second elements is not smaller than a predetermined value.

9. The edge crack detection apparatus according to claim 1,
    wherein the second region is a region between the plate edge position and a position offset inward in the plate width direction from the plate edge position.

10. The edge crack detection apparatus according to claim 1,
    wherein the detection part includes:
        a radiation receiving part including the plurality of elements; and
        a radiation generation part disposed at an opposite side to the radiation receiving part across the metal plate and configured to generate radiation which radiates toward the radiation receiving part, and
    wherein each of the plurality of elements is configured to detect absence of the metal plate at a position of the element in the plate width direction when receiving the radiation, and detect presence of the metal plate at the position of the element in the plate width direction when not receiving the radiation.

11. A rolling mill facility, comprising:
    a rolling mill apparatus for rolling a metal plate; and
    the edge crack detection apparatus according to claim 1 configured to detect an edge crack at an end portion, in the plate width direction, of the metal plate during rolling by the rolling mill apparatus.

12. An edge crack detection apparatus for detecting an edge crack of a metal plate being conveyed, the edge crack detection apparatus comprising:

a detection part including a plurality of elements arranged along a plate width direction of the metal plate, each of the plurality of elements being configured to be capable of detecting presence or absence of the metal plate at a position of the element in the plate width direction;

a plate edge position determination part configured to determine a plate edge position of the metal plate in the plate width direction on the basis of a detection result of each of a plurality of first elements positioned within a first region in the plate width direction, from among the plurality of elements; and an edge crack detection part configured to detect an edge crack of the metal plate on the basis of a detection result of each of a plurality of second elements selected on the basis of the plate edge position and positioned within a second region which is narrower than the first region in the plate width direction, from among the plurality of elements, wherein the edge crack detection part is configured to determine a possibility of existence of the edge crack of the metal plate on the basis of whether the second element positioned at an inner side of the plate edge position detects absence of the metal plate, from among the plurality of second elements, wherein the edge crack detection apparatus includes:
- a first-end side edge crack detection part being the edge crack detection part;
- a second-end side edge crack detection part being the edge crack detection part and being disposed at an opposite side to the first-end side edge crack detection part across the metal plate in the plate width direction; and
- a second determination part configured to determine that the metal plate has the edge crack if, at the same time, the first-end side edge crack detection part determines that there is a possibility of the edge crack and the second element of the second-end side edge crack detection part positioned at an outer side of the plate edge position in the plate width direction does not detect presence of the metal plate.

13. A method of detecting an edge crack of a metal plate being conveyed, using a detection part including a plurality of elements arranged along a plate width direction of the metal plate, each of the plurality of elements being configured to be capable of detecting presence or absence of the metal plate at a position of the element in the plate width direction, the method comprising:

a step of determining a plate edge position of the metal plate in the plate width direction on the basis of a detection result of each of a plurality of first elements positioned within a first region in the plate width direction, from among the plurality of elements;

a step of selecting, on the basis of the determined plate edge position, a plurality of second elements positioned within a second region which is narrower than the first region in the plate width direction, from among the plurality of elements; and a step of detecting an edge crack of the metal plate on the basis of a detection result by each of the plurality of the selected second elements, wherein the step of detecting an edge crack of the metal plate includes determining a possibility of existence of the edge crack of the metal plate on the basis of whether the second element positioned at an inner side of the plate edge position detects absence of the metal plate, from among the plurality of second elements, and wherein the method comprises:
determining a possibility of existence of the edge crack of the metal at a first position in a conveyance direction of the metal plate;
determining a possibility of existence of the edge crack of the metal at a second position which is a position different from the first position in the conveyance direction of the metal plate; and
determining that the metal plate has the edge crack if, at the same time, it is determined that there is a possibility of the edge crack at only one of the first position or the second position.

* * * * *